United States Patent
Bryant

(10) Patent No.: US 7,199,959 B1
(45) Date of Patent: Apr. 3, 2007

(54) REPEATABLE TIMING ERROR CORRECTION SYSTEM FOR USE IN A SERVO WRITER

(75) Inventor: Lawrence M. Bryant, Palo Alto, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 176 days.

(21) Appl. No.: 11/010,554

(22) Filed: Dec. 13, 2004

(51) Int. Cl.
*G11B 5/09* (2006.01)

(52) U.S. Cl. .......................... 360/51; 360/53; 360/31; 360/75

(58) Field of Classification Search ................ None
See application file for complete search history.

(56) References Cited

U.S. PATENT DOCUMENTS

| | | | |
|---|---|---|---|
| 5,668,679 A | | 9/1997 | Swearingen et al. |
| 6,388,833 B1 * | | 5/2002 | Golowka et al. ........ 360/77.02 |
| 6,515,813 B2 * | | 2/2003 | Kitazaki et al. .............. 360/51 |
| 6,542,044 B1 * | | 4/2003 | Berquist et al. ............ 331/176 |
| 6,657,810 B1 * | | 12/2003 | Kupferman .............. 360/77.04 |
| 6,664,827 B2 * | | 12/2003 | O'Leary et al. ............. 327/156 |
| 6,788,350 B2 * | | 9/2004 | Zimmermann ............... 348/512 |
| 6,898,035 B1 * | | 5/2005 | Chainer et al. ................ 360/51 |
| 2003/0123180 A1 * | | 7/2003 | Settje et al. ............. 360/77.04 |
| 2004/0070432 A1 * | | 4/2004 | Chauhan ..................... 327/156 |
| 2004/0156137 A1 * | | 8/2004 | Settje et al. .................. 360/51 |

\* cited by examiner

*Primary Examiner*—Andrea Wellington
*Assistant Examiner*—Dismery Mercedes
(74) *Attorney, Agent, or Firm*—Blakely, Sokoloff, Taylor & Zafman

(57) ABSTRACT

A servo writing system for writing servo sectors onto a disk includes a direct digital synthesizer (DDS) that forms a phase and frequency adjustable continuous wave signal based upon a reference digital clock signal. A PLL coupled to the DDS measures repeatable timing errors (RTEs) associated with the continuous wave signal and generates an output clock signal that is used to clock the writing of servo sectors onto the disk. A digital control system is coupled to the DDS and the PLL, which calculates repeatable error compensation adjustment values based on the RTEs measured using the PLL. The compensation adjustment values may be applied to the DDS such that the DDS compensates for the RTEs and such that the output clock signal used to clock the writing of the servo sectors onto the disk includes minimal RTEs.

22 Claims, 7 Drawing Sheets

REPEATABLE TIMING ERROR CORRECTION SYSTEM FOR USE IN A SERVO WRITER

BACKGROUND OF THE INVENTION

1. Field of the Invention

The present invention relates to repeatable timing error correction systems and methods. More particularly, the present invention relates to repeatable timing error correction systems and methods for use with a servo writer.

2. Description of the Prior Art and Related Information

Computer systems often rely on disk drives for storing and retrieving data. Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to write or read information to or from that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head by a servo control system of the disk drive.

The most popular form of servo control is "embedded servo" wherein the servo information is written in a plurality of servo sectors that are angularly spaced from one another and that are interspersed between data sectors around each track of each disk.

When manufacturing a disk drive, servo sectors $2_0$–$2_N$ are written to a disk 4 in order to define a plurality of evenly-spaced, concentric data tracks 6, as shown in the prior art disk format of FIG. 1. Each servo sector (e.g., servo sector $2_4$) includes a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the servo control system of the disk drive in order to maintain the head over a centerline of a target track while writing or reading data.

Servo writers may be used to write the servo sectors $2_0$–$2_N$ to the disk surface during manufacturing. Servo writers may employ extremely accurate head positioning mechanics, such as laser interferometers or optical encoders, to ensure that the servo sectors $2_0$–$2_N$ are written at the proper radial location from the outer diameter of the disk to the inner diameter of the disk. In addition, extremely accurate clocking systems are necessary in order to write the servo sectors in the proper circumferential locations $2_0$–$2_N$ on the disk.

Unfortunately, conventional clocking systems utilized in servo writers often impart repeatable timing errors into the servo writing process such that servo sectors (e.g. $2_0$–$2_N$) are written to the disk in a manner that incorporates the repeatable timing errors of the clocking system. This results in poor accuracy in the location of the servo sectors written onto the disk, which can result in poor tracking behavior of the disk drive servo system, and a lower data capacity than may otherwise be achieved. Eccentricity associated with the servo sectors results in timing uncertainties being introduced into the servo control system and resultant servo control signals. When this eccentricity occurs, the servo sectors appear to the servo control system of the disk drive as if they are not evenly spaced such that timing uncertainties are introduced into the servo control system causing problems in both the reading and writing of data.

Thus, servo writers that write servo sectors and servo information to disks need an accurate clock source. However, as previously discussed, conventional clock systems typically used in the servo writing process may be subject to repeatable timing errors. Unfortunately, these repeatable timing errors are incorporated into the written servo sectors resulting in degraded disk drive performance and lower data capacity.

SUMMARY OF THE INVENTION

In one aspect, the invention may be regarded as a servo writing system for writing servo sectors onto a disk responsive to a reference digital clock signal and for compensating for repeatable timing errors associated with the reference digital clock signal.

In one embodiment, the servo writer includes a direct digital synthesizer (DDS), a phase lock loop (PLL), and a digital control system. The DDS forms a phase and frequency adjustable continuous wave signal based upon the reference digital clock signal. The PLL is coupled to the DDS. The PLL is used to measure repeatable timing errors associated with the phase and frequency adjustable continuous wave signal and generates an output clock signal that is used to clock the writing of servo sectors onto the disk. The digital control system is coupled to the DDS and the PLL.

The digital control system calculates repeatable error compensation adjustment values based on the repeatable timing errors measured using the PLL. The repeatable error compensation adjustment values may be applied to the DDS such that the DDS compensates for the repeatable timing errors and the output clock signal used to clock the writing of the servo sectors onto the disk therefore includes only minimal remaining repeatable timing errors.

In one embodiment, the PLL may comprise a voltage or a current controlled oscillator and the repeatable timing errors may be measured from one of a frequency control voltage or a frequency control current that is applied to the respective voltage or current controlled oscillator. The PLL may also include a phase detector and the repeatable timing errors may be measured from a phase error signal generated by the phase detector.

In one embodiment, the digital control system may further comprise programmable logic to control: calculating repeatable error compensation adjustment values based on the repeatable timing errors measured by the PLL; storing the repeatable error compensation adjustment values in a correction table; and applying the repeatable error compensation adjustment values from the correction table to control the DDS in a manner that minimizes these repeatable timing errors before they are measured by the PLL. For example, the programmable logic may include a programmable microprocessor or dedicated logic circuits.

Further, if the compensation of the repeatable timing errors does not sufficiently minimize the repeatable timing errors on a first attempt, the digital control system may iteratively calculate additional repeatable compensation adjustment values based on any remaining repeatable timing errors measured using the PLL for application to the DDS until the repeatable timing errors are sufficiently minimized.

In one embodiment, the servo writer may operate in an in-situ environment in which the servo writer is directly coupled to a disk drive comprising a head disk assembly (HDA) including a disk or several disks, an actuator arm, and a head coupled to the distal end of the actuator arm. The servo writer may control the HDA such that the actuator arm is rotated to position the head radially over the disk in order to write servo sectors onto the disk based on an output clock signal that has been processed to minimize repeatable timing errors.

In another embodiment, the servo writer may operate in an external media writing environment in which the disk or disks are written before being assembled into the disk drive. In this embodiment the servo writer controls a head that is radially positioned over a disk in order to write servo sectors onto the disk based on an output clock signal that has been processed to minimize repeatable timing errors.

In another aspect, the invention may be regarded as a method of writing servo sectors onto a disk responsive to a reference digital clock signal and for compensating for repeatable timing errors associated with the reference digital clock signal. The method may include: creating a phase and frequency adjustable continuous wave signal based upon the reference digital clock signal; measuring repeatable timing errors associated with the phase and frequency adjustable continuous wave signal; calculating repeatable error compensation adjustment values based on the measured repeatable timing errors; compensating for the repeatable timing errors in the phase and frequency adjustable continuous wave signal based on the repeatable error compensation adjustment values; generating an output clock signal based on the phase and frequency adjustable continuous wave signal that is used to clock the writing of servo sectors onto the disk; and clocking the writing of servo sectors based on the output clock signal onto the disk such that servo sectors are written with minimized repeatable timing errors.

In another aspect, the invention may be regarded as a timing circuit for compensating for repeatable timing errors associated with a reference clock signal. The timing circuit may comprise a direct digital synthesizer (DDS), a phase lock loop (PLL), and a digital control system. The DDS may be used to form a phase and frequency adjustable continuous wave signal based upon the reference clock signal. The PLL may be coupled to the DDS and may be used to measure repeatable timing errors associated with the phase and frequency adjustable continuous wave signal from the DDS and to generate an output clock signal. The digital control system may be coupled to the DDS and the PLL. The digital control system may be used to calculate repeatable error compensation adjustment values based on the repeatable timing errors measured using the PLL. The repeatable error compensation adjustment values may be applied to the DDS such that the DDS can compensate for the repeatable timing errors before they are measured by the PLL and the output clock signal may therefore include minimal repeatable timing errors.

The foregoing and other features are described in detail in the Detailed Description and are set forth in the appended claims.

DETAILED DESCRIPTION

Figure 1:
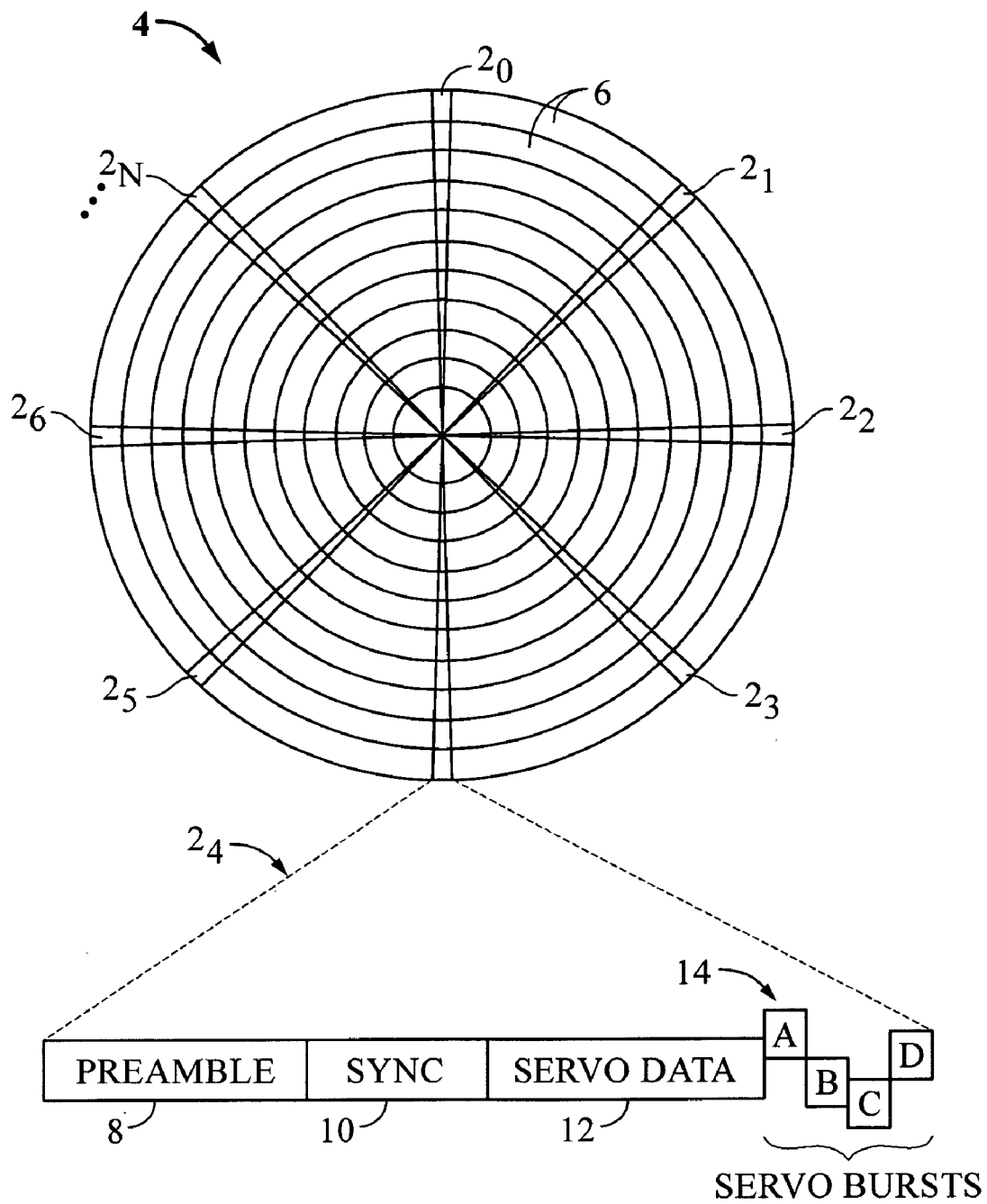
FIG. 1 is an example of a disk with a commonly used disk format.
Figure 2:
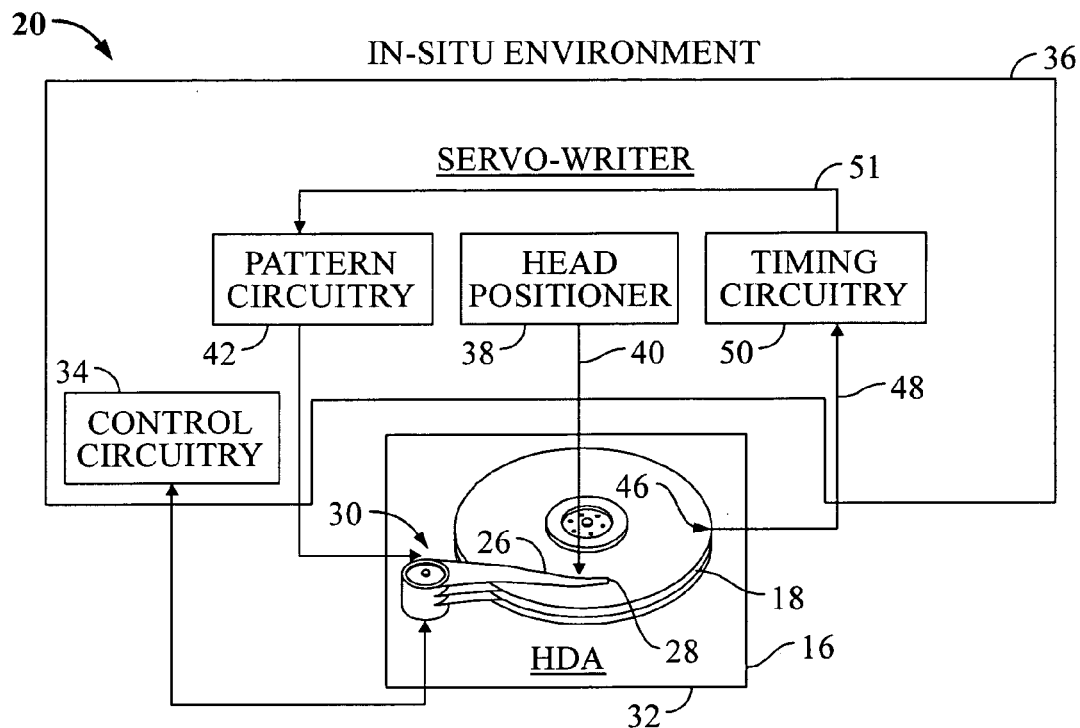
FIG. 2 is an example of a servo writer in an in-situ environment, in which embodiments of the invention may be utilized.
Figure 3:
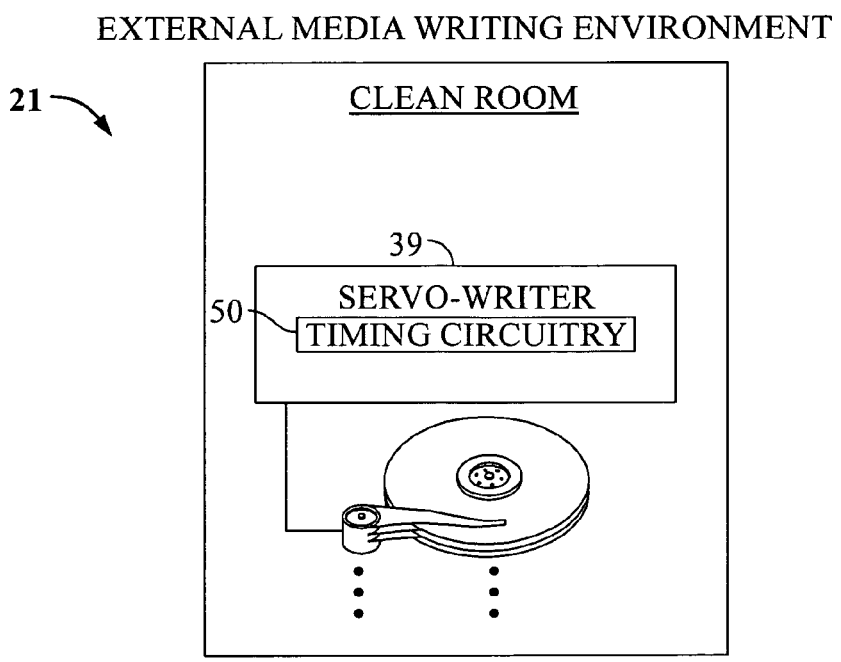
FIG. 3 is an example of a servo writer in an external media writing environment, in which embodiments of the invention may be utilized.

Looking at FIGS. 2 and 3, examples of servo writers for writing servo sectors onto a disk responsive to a reference digital clock signal and for compensating for repeatable timing errors associated with the reference digital clock signal are illustrated. Particularly, timing circuitry, according to embodiments of the invention, is shown in each of the exemplary servo writers, the components of which will be discussed in more detail later. The timing circuitry 50, as will be discussed, is utilized for compensating for repeatable timing errors associated with a reference digital clock signal.

Particularly, FIG. 2 is an example of a servo writer in an in-situ environment, in which embodiments of the invention for the timing circuitry 50 may be utilized. As shown in FIG. 2, a servo writer 36 operates an in-situ environment 20, in which the servo writer 36 writes servo sectors (previously discussed) and other servo information to a disk 18 of a disk drive 16.

The disk drive 16 comprises a head disk assembly (HDA) 32 including the disk 18, an actuator arm 26, a head coupled to a distal end of the actuator arm 26, and a voice coil motor 30 for rotating the actuator arm 26 about a pivot to position the head 28 radially over the disk 18. A write clock is synchronized to the rotation of the disk 18 and a plurality of servo sectors may be written onto the disk 18 at predetermined radial locations determined from the write clock and the timing circuitry 50.

The servo writer 36 comprises a head positioner 38 for actuating a head positioning pin 40 using sensitive position measurement circuitry, such as a laser interferometer or optical encoder. Pattern circuitry 42 generates the data sequence written to the disk 18 for the servo sectors. An optical or magnetic clock head 46 reads a optical or magnetic clock track to generate a clock signal 48 processed by timing circuitry 50 to synchronize a write clock signal 51 so that the servo wedges are written at appropriate radial positions. This optical or magnetic clock track may be formed at the outside radius of at least one disk, or it may also be formed at the inside radius of at least one disk, or it may be formed or written on some other rotating member of the disk drive such as the spindle motor hub or the disk attachment clamp.

Particularly, the servo writer 36 controls the HDA 32 such that the actuator arm 26 is rotated to position the head 28 radially over the disk 18 in order to write servo sectors onto the disk 18 based on the output clock signal 51 that has been processed by timing circuitry 50, according to embodiments of the invention, to minimize repeatable timing errors, as will be discussed.

In another embodiment, as shown in FIG. 3, timing circuitry 50 may likewise be used in a servo writer 39 in an external media writing environment 21. In this embodiment, the servo writer 39 operates in an external media writing environment 21, such as a clean room. For example, in an external media writing environment, multiple disks may be servowritten without having to be located in a disk drive.

However, similar to the servo writer described in FIG. 2, the servo writer 39 still controls a head that is radially positioned over a disk in order to write servo sectors onto the disk based on an output clock signal of timing circuitry 50, according to embodiments of the invention, such that the output clock signal has been processed to minimize repeatable timing errors.

It should also be appreciated based upon the following description that the timing circuitry 50 may be utilized in many different environments for different purposes, and is not limited to use with only a servo writer.

Figure 4:
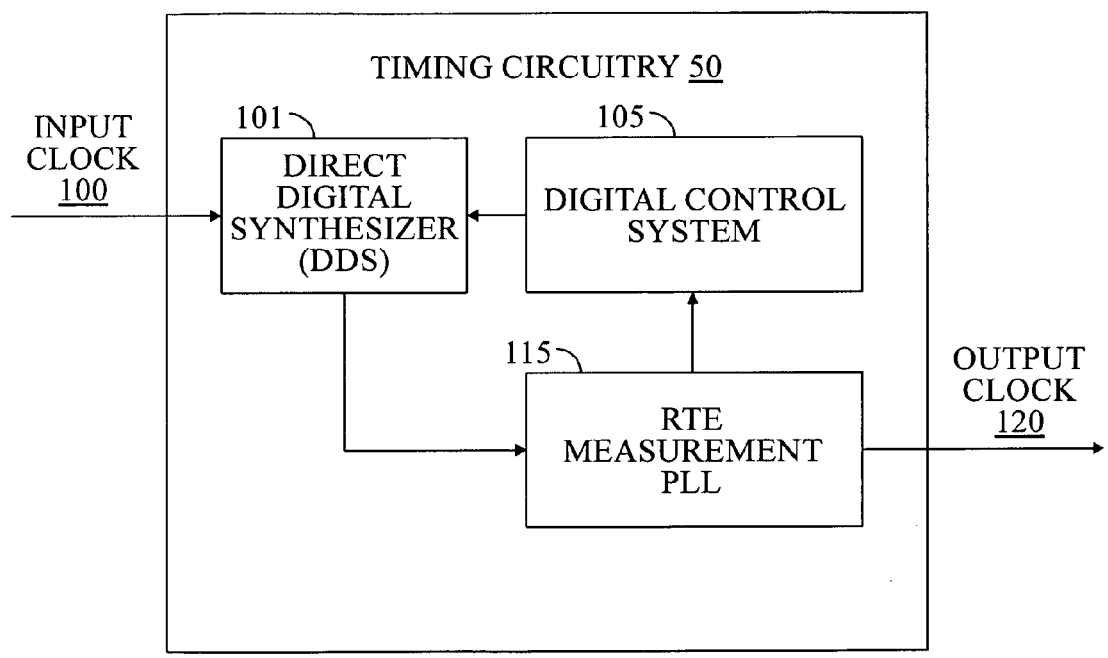
FIG. 4 is a block diagram illustrating a simplified example of timing circuitry for use in a servo writer for compensating for repeatable timing errors associated with a reference input digital clock signal, according to one embodiment of the invention.

Turning now to FIG. 4, FIG. 4 is a block diagram illustrating a simplified example of timing circuitry 50 for use in a servo writer for compensating for repeatable timing errors associated with a reference input digital clock signal, according to one embodiment of the invention.

In one embodiment, timing circuitry 50 includes a direct digital synthesizer (DDS) 101, a repeatable timing error (RTE) measurement phase lock loop (PLL) 105 coupled to the DDS 101, and a digital control system 115 coupled to the DDS 101 and the RTE measurement PLL 105.

The DDS 101 forms a phase and frequency adjustable continuous wave signal based upon an input reference digital clock signal 100. The phase and frequency adjustable continuous wave signal is passed onto the RTE measurement PLL 105. The RTE measurement PLL 105 enables the measurement of repeatable timing errors associated with the phase and frequency adjustable continuous wave signal and generates an output clock signal 120 that is used to clock the writing of servo sectors onto the disk, as previously discussed.

Further, the digital control system 115 calculates repeatable error compensation adjustment values based on the repeatable timing errors measured utilizing the RTE measurement PLL 105 and applies these repeatable error compensation adjustment values to the DDS 101 such that the DDS 101 compensates for the repeatable timing errors before they are forwarded and measured by the RTE measurement PLL 105, as part of a feedback control system, such that the output clock signal 120 used to clock the writing of servo sectors onto the disk is continually updated to minimize repeatable timing errors. A more detailed discussion of the components of the timing circuitry 50 will be discussed hereinafter.

As will be discussed, the RTE measurement PLL 105 is an analog phase locked loop system that is coupled with the DDS 101 in such a way as to maximize the ability of the timing circuitry to accurately measure repeatable timing errors in a manner that introduces proportional compensation with minimum additional short term timing error. Repeatable timing errors may be measured from a control voltage applied to a voltage-controlled oscillator within RTE measurement PLL 105 or a control current applied to a current controlled oscillator within RTE measurement PLL 105 such that proportional compensation is achieved by means of digital control information communicated to the DDS 101, as will be discussed.

Figure 5:
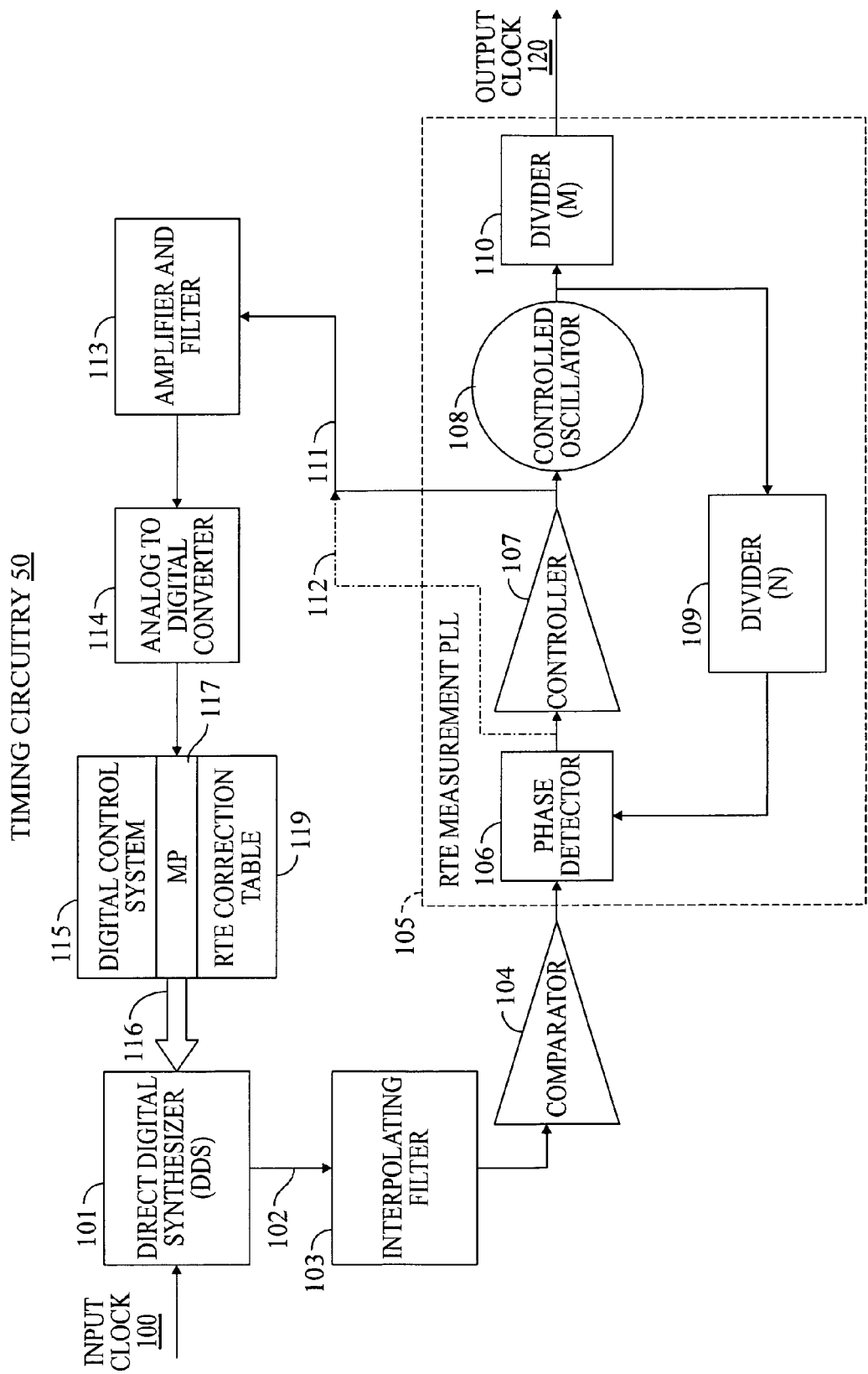
FIG. 5 is a block diagram illustrating the detailed components of the timing circuitry, according to one embodiment of the invention.

With reference now to FIG. 5, FIG. 5 is a block diagram illustrating the detailed components of timing circuitry 50, according to one embodiment of the invention. As shown in FIG. 5, input reference digital clock 100 is utilized as a clock source by DDS 101. It should be noted that input reference digital clock signal 100, as is common with some digital clocks, exhibits repeatable timing errors (RTEs). The input reference digital clock signal 100 is coupled to DDS 101 and is used as a primary clock source for DDS 101.

It should also be noted that DDS devices are well known in the art and are in common usage in communication systems.

Figure 6:
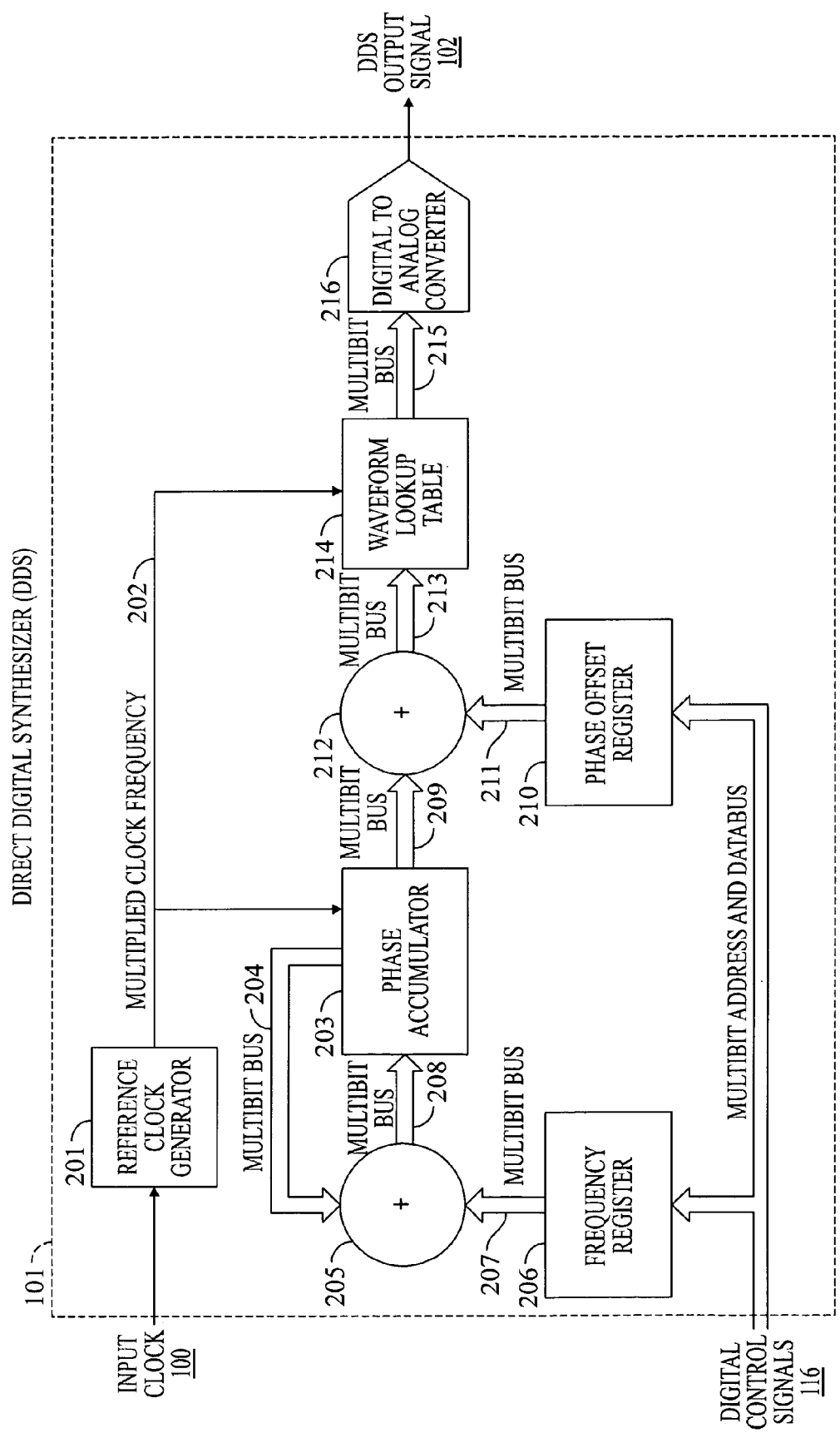
FIG. 6 is a block diagram illustrating an example of a direct digital synthesizer (DDS) that may be utilized in embodiments of the invention.

With brief reference now to FIG. 6, FIG. 6 is a block diagram illustrating an example of a common DDS 101. It should be noted that the DDS 101 to be hereinafter described is merely one example of a DDS for use in timing circuitry 50.

As shown in FIG. 6, input reference digital clock signal 100 may be coupled to reference clock generator 201. Typically, reference clock generator 201 operates on input reference digital clock signal 100 by frequency multiplication usually utilizing a PLL structure within the reference clock generator 201 itself. This multiplied clock frequency 202 may be used as the clock source for a digital numerical waveform generator. To this end, multiplied clock frequency 202 is typically connected to at least one phase accumulator register 203 and may also be used to synchronize other circuits within the DDS 101, such as wave form lookup table 214.

Digital control signals 116 are coupled to at least one frequency register 206 and possibly one or more phase offset registers 210. Phase accumulator 203 is coupled back to itself by multi-bit bus 204 and multi-bit bus 208 through adder 205 whereupon the frequency value from the frequency register 206 is successively added via multi-bus 207 to adder 205 for each multiplied clock 202 signal edge that occurs.

The numeric value in phase accumulator 203 continues to increase until digital overflow occurs at which time this numeric value wraps around to a low value again. The total range of values of the uppermost bits of phase accumulator 203 represent one repeat cycle of the waveform stored in waveform lookup table 214. The number of bits used to address the values in waveform lookup table 214 may vary from just a few to several dozen depending on the intended application for DDS 101.

Multi-bit bus 209 carries the uppermost bits of phase accumulator 203 through adder 212 via multi-bit bus 213 to waveform lookup table 214.

Phase offset register 210 is coupled to adder 212 via multi-bit bus 211 so that an additional phase offset may be introduced to DDS output signal 102 if desired. Successive amplitude values of DDS output signal 102 are accessed in waveform lookup table 214 and are then coupled to multi-bit bus 215 to digital to analog converter (DAC) 216. DAC 216 converts the successive digital numeric values addressed in waveform lookup table 214 into an analog voltage or current amplitude, which is then coupled out of the DDS via DDS output signal 102. DDS output signal 102 will hereinafter be referred to as a phase and frequency adjustable continuous wave signal.

Looking back to FIG. 5, phase and frequency adjustable continuous wave signal 102 is coupled through interpolating filter 103 into comparator 104. Interpolating filter 103 may be used to smooth the abrupt changes in voltage or current amplitude and, in conjunction with comparator 104, aids in performing the function of interpolating the time between successive level crossings of the waveform of the DDS output phase and frequency adjustable continuous wave signal 102. The multiplied clock frequency of the DDS 101 would normally represent an unacceptable limit in the time resolution and jitter of eventual output clock signal 120. However, the interpolation operation performed by interpolating filter 103 and comparator 104 enhances the effective time resolution of the DDS output phase and frequency adjustable continuous wave signal 102 by as little as ten to as much as one thousand.

The output of comparator 104 is coupled to the input of a traditional phase lock loop (PLL) structure 105 that is modified to support measurement of repeatable timing errors (RTEs). Thus, the PLL will hereinafter be referred to as RTE measurement PLL 105.

Phase detector 106, which, in one embodiment, may be a traditional phase-frequency detector, generates a phase error signal that is then coupled through controller circuit 107 to controlled oscillator 108. The controlled oscillator 108 may be either a voltage or current controlled oscillator and repeatable timing errors, as will be discussed, may be measured from one of a frequency control voltage, or a frequency control current, applied to the voltage or current controlled oscillator, respectively, whichever configuration is utilized.

Finally, the output of controlled oscillator 108 is coupled to output clock 120 through output divider 110. However, it should be appreciated that a divider may not be utilized and the output clock 120 may be directly output. Continuing with the current example, the use of dividers 109 and 110 enables PLL 105 to make additional frequency changes to arrive at a multitude of possible frequencies for output clock 120. However, if this additional frequency adjustment ability is not required, the dividers 109 and 110 may be omitted and bypassed.

RTE measurement PLL 105 is enhanced by an additional connection 111 that couples the frequency control voltage or current amplitude at the input of the controlled oscillator 108 into an amplifier and filter 113. Optionally, a connection 112 may be coupled, either singly or in conjunction with connection 111 to amplifier and filter 113. Connection 111 allows the phase error signal generated by the phase detector that appears at the output of the phase detector 106 to be measured, so that repeatable timing errors may be measured from the oscillator control or from the phase detector output or from both.

Amplifier and filter 113 is then coupled to the input of analog to digital converter (ADC) 114. ADC 114 converts either the phase error or frequency control signals, or both, of the RTE measurement PLL 105 into digital signals for digital numeric processing by digital control system 115. Digital control system 115 may include programmable logic to control: calculating repeatable error compensation adjustment values based on the repeatable timing errors measured by the RTE measurement PLL 105; storing repeatable error compensation adjustment values in a RTE correction table 119; and applying the repeatable error compensation adjustment values from the correction table 119 to control the DDS 101 in a manner that minimizes these repeatable timing errors in the eventual output clock 120 and before they are subsequently measured by the RTE measurement PLL 105. In this way, a feedback control system is created.

In one embodiment, the programmable logic may include a microprocessor 117. However, in other embodiments, the programmable logic may include dedicated logic circuits.

Thus, digital control system 115, which, as previously discussed, may be composed of a microprocessor computer system 117 or dedicated custom logic circuits, collects the measured phase or frequency control signals of the RTE measurement PLL 105 and performs numerical calculations to determine the repeatable components of these signals. It should be appreciated that well-known algorithms are known in the art to determine repeatable components of signals. Once the repeatable components are determined, then the appropriate compensating adjustment values to be applied to the DDS 101 are determined. These compensating adjustment values are stored in a RTE correction table 119 within the digital control system 115.

The repeatable error compensation adjustment values of the RTE correction table 119 are then synchronously applied via multi-bit address and data bus 116 to the frequency 206 and/or phase 210 registers in DDS 101. In this way, DDS 101 is adjusted in frequency and phase in a manner that opposes and thereby reduces the repeatable timing errors of the input reference digital clock signal 100.

If the first set of compensation adjustments applied to DDS 101 do not reduce the repeatable timing errors of reference input digital clock signal 100, then additional measurements of repeatable timing errors (RTEs) can be made by RTE measurement PLL 105 while this first set of compensating adjustments are applied. By repeating this adjustment and measurement process a feedback loop is established which allows the RTEs to be reduced even further with each adjustment and measurement until a desired degree of compensation is achieved. This iterative measurement and adjustment process also compensates for any sensitivity or gain variations that the various circuits of the RTE measurement PLL 105 may have. Such sensitivity and gain variations are common in analog PLL structures, such as RTE measurement 105, but do not limit the performance of the embodiments of this invention.

Thus, if the compensation of the repeatable timing errors does not sufficiently minimize the repeatable timing errors (RTEs) on a first attempt, the digital control system 115 may iteratively calculate additional repeatable compensation adjustment values based on any remaining repeatable timing errors measured using the RTE measurement PLL 105 for application to the DDS 101 until the repeatable timing errors are sufficiently minimized.

Thus, by placing an analog PLL, such as RTE measurement PLL 105, following DDS 101, the benefits of the low jitter capabilities of analog PLL designs, as may be incorporated into RTE measurement PLL 105, can be utilized to create low jitter on output clock 120. More particularly, by judicious selection of the gain crossover frequency of RTE measurement PLL 105, additional reductions in residual clock jitter from DDS 101 may be obtained. In addition, measurement of various small timing errors is made possible by appropriate selections of the characteristics of amplifier and filter 113. As should be appreciated by those with skill in this art, the gain and frequency characteristics of amplifier and filter 113 may optionally be changed with each successive measurement and compensation repetition so as to maximize the ability to measure and eliminate repeatable timing errors.

Figure 7:
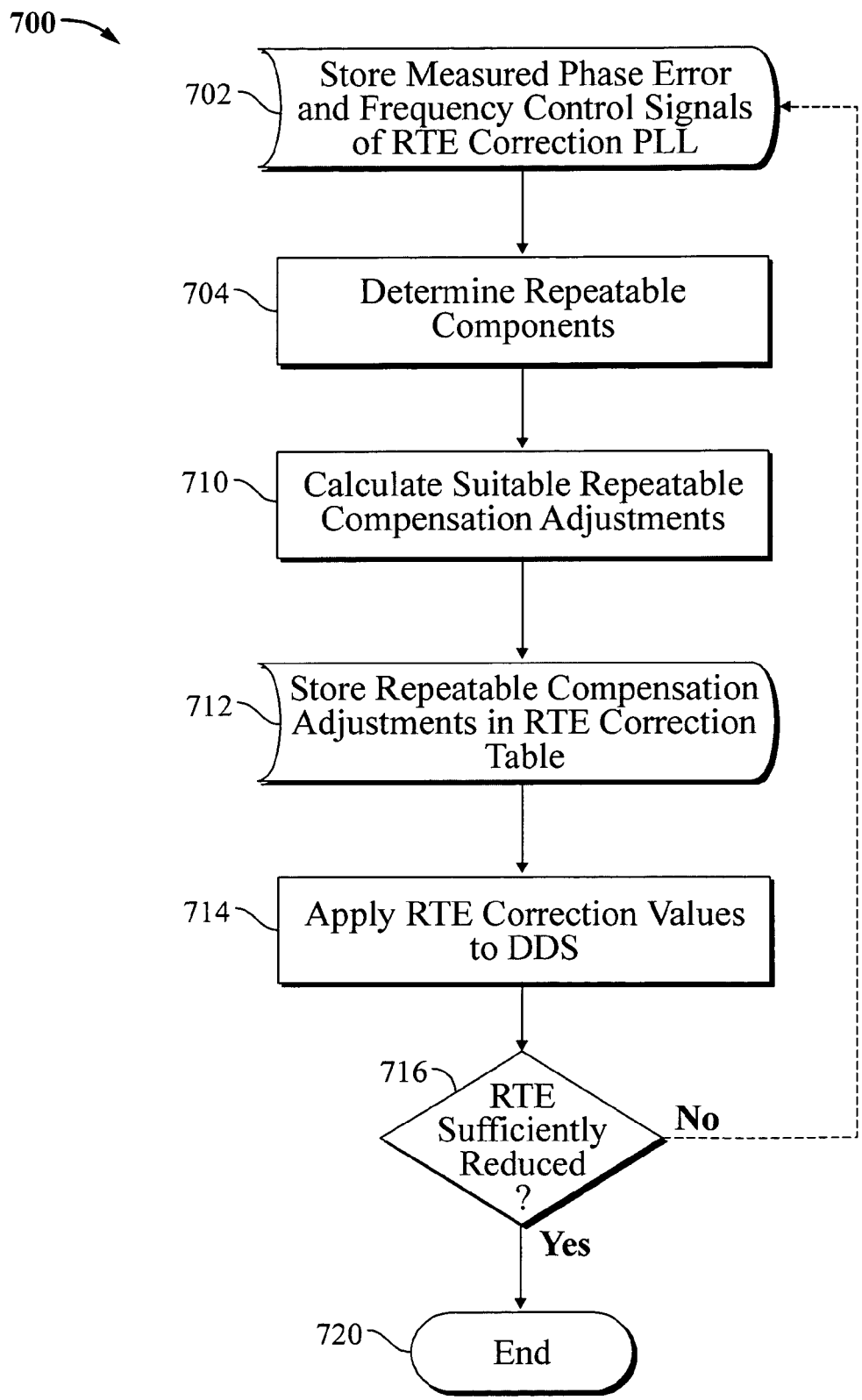
FIG. 7 is a flow diagram illustrating a process to iteratively reduce repeatable timing errors (RTEs), according to one embodiment of the invention.

Turning now, briefly, to FIG. 7, FIG. 7 shows a flow diagram illustrating a process 700 to iteratively reduce repeatable timing errors (RTEs), according to one embodiment of the invention. At block 702, the process to iteratively reduce RTE, starts. At block 704, RTE compensation adjustment values are initialized in the RTE correction table. Next, at block 706, the RTE correction table values are applied to the DDS.

As previously discussed, at block 708, frequency or phase signals from the RTE PLL are measured. Repeatable timing error measurements are then determined from these measured frequency or phase signals (block 710). Then, suitable repeatable compensation adjustment values are calculated (block 712). These repeatable compensation adjustment values are then stored in the RTE correction table of the digital control system (block 714).

At decision block 716, the process 700 next determines whether the repeatable timing errors (RTEs) have been sufficiently reduced. If not, the process 700 branches back to block 706 and again applies RTE correction table values to the DDS, and after this first or preceding attempt, continues by iteratively calculating additional repeatable compensation adjustment values based on remaining repeatable timing errors measured using the PLL for application to the DDS until the repeating timing errors are sufficiently minimized (as exemplified in blocks 708–714).

However, if at block 716 it is determined that the repeatable timing errors (RTEs) have been sufficiently reduced, then the process 700 ends (block 720).

Figure 8:
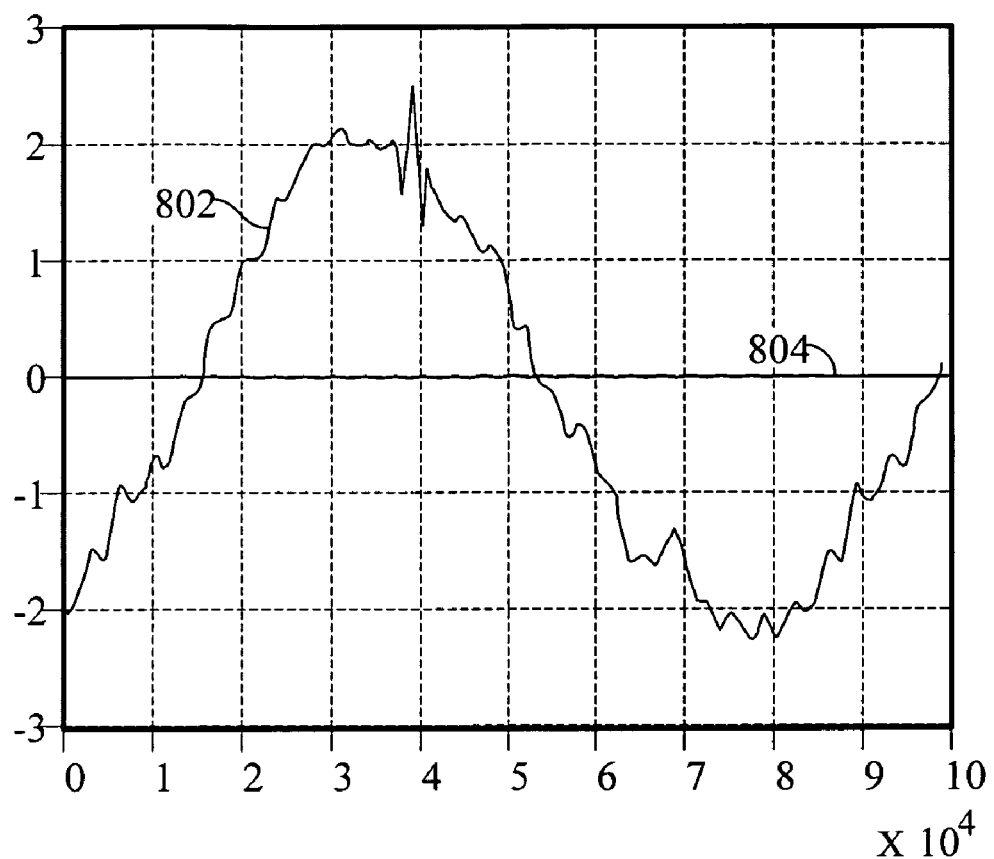
FIG. 8 is a graph diagram illustrating repeatable timing errors (RTEs) before and after the application of RTE measurement compensation.

Turning now to FIG. 8, FIG. 8 is a graph diagram illustrating repeatable timing errors (RTEs) before and after the application of RTE measurement compensation. In this graph, the x-axis designates time in seconds and the y-axis designates the relative magnitude of repeatable timing errors (RTEs).

As can be seen by graph line 802, representing an output clock signal without repeatable error compensation, there is a relatively large repeatable timing error (i.e. once-around) associated with a typical output clock of a timing circuit. However, as can be seen by graph line 804, after application of the embodiments of the invention related to repeatable timing error correction system and methods, as previously discussed and as exemplified by previously discussed timing circuitry 50, the output clock signal shown as graph line 804 is compensated with repeatable error compensation adjustment values such that it includes minimal repeatable timing errors.

In the servo writer environment, as previously discussed, this output clock signal 804 with minimal repeatable timing errors may be utilized in the writing of servo sectors onto a disk such that they are accurately written onto the disk without repeatable timing errors incorporated therein. By accomplishing this, the performance of the servo control system of the disk drive is greatly enhanced.

While embodiments of the present invention and its various functional components have been described in particular embodiments, it should be appreciated that the embodiments can be implemented in hardware, software, firmware, middleware, or a combination thereof and utilized in systems, subsystems, components, or sub-components thereof. When implemented in software, or firmware, the elements of the embodiments of the invention are the instruction/code segments to perform the necessary tasks.

I claim:

1. A servo writer for writing servo sectors onto a disk responsive to a reference digital clock signal and for compensating for repeatable timing errors associated with the reference digital clock signal, the servo writer comprising:
   a direct digital synthesizer (DDS) to form a phase and frequency adjustable continuous wave signal based upon the reference digital clock signal;
   a phase lock loop (PLL) coupled to the DDS, the PLL to measure repeatable timing errors associated with the phase and frequency adjustable continuous wave signal and to generate an output clock signal that is used to clock the writing of servo sectors onto the disk; and
   a digital control system coupled to the DDS and the PLL, the digital control system to calculate repeatable error compensation adjustment values based on the repeatable timing errors measured using the PLL;
   wherein the repeatable error compensation adjustment values are applied to the DDS such that the DDS compensates for the repeatable timing errors and the output clock signal used to clock the writing of servo sectors onto the disk includes minimal repeatable timing errors.

2. The servo writer of claim 1, wherein the PLL comprises one of a voltage or current controlled oscillator and the repeatable timing errors are measured from one of a frequency control voltage or frequency control current applied to the voltage or current controlled oscillator, respectively.

3. The servo writer or claim 1, wherein the PLL includes a phase detector and the repeatable timing errors are measured from a phase error signal generated by the phase detector.

4. The servo writer of claim 1, wherein the digital control system further comprises programmable logic to control:
   calculating repeatable error compensation adjustment values based on the repeatable timing errors measured by the PLL;
   storing the repeatable error compensation adjustment values in a correction table; and
   applying the repeatable error compensation adjustment values from the correction table to control the DDS in a manner that minimizes these repeatable timing errors before they are measured by the PLL.

5. The servo writer of claim 4, wherein the programmable logic includes a programmable microprocessor.

6. The servo writer of claim 4, wherein the programmable logic includes dedicated logic circuits.

7. The servo writer of claim 1, wherein, if the compensation of the repeatable timing errors does not sufficiently minimize the repeatable timing errors on a first attempt, the digital control system iteratively calculates additional repeatable compensation adjustment values based on any remaining repeatable timing errors measured using the PLL for application to the DDS until the repeatable timing errors are sufficiently minimized.

8. The servo writer of claim 1, wherein the servo writer operates in an in-situ environment in which the servo writer is directly coupled to a disk drive comprising a head disk assembly (HDA) including the disk, an actuator arm and a head coupled to a distal end of the actuator arm, the servo writer controlling the HDA such that the actuator arm is rotated to position the head radically over the disk in order to write servo sectors onto the disk based on the output clock signal that has been processed to minimize repeatable timing errors.

9. The servo writer of claim 1, wherein the servo writer operates in an external media writing environment in which the servo writer controls a head that is radically positioned over a disk in order to write servo sectors onto the disk based on the output clock signal that has been processed to minimize repeatable timing errors.

10. A method of writing servo sectors onto a disk responsive to a reference digital clock signal and for compensating for repeatable timing errors associated with the reference digital clock signal, the method comprising:

creating a phase and frequency adjustable continuous wave signal based upon the reference digital clock signal;

measuring repeatable timing errors associated with the phase and frequency adjustable continuous wave signal;

calculating repeatable error compensation adjustment values based on the measured repeatable timing errors;

compensating for the repeatable timing errors in the phase and frequency adjustable continuous wave signal based on the repeatable error compensation adjustment values;

generating an output clock signal based on the phase and frequency adjustable continuous wave signal that is used to clock the writing of servo sectors onto the disk;

clocking the writing of servo sectors based on the output clock signal onto the disk such that servo sectors are written with minimized repeatable timing errors.

11. The method of claim 10, wherein the repeatable timing errors are measured from one of a frequency control voltage or frequency control current applied to a voltage or current controlled oscillator of a phase lock loop (PLL), respectively.

12. The method of claim 11, wherein the repeatable timing errors are measured from a phase error signal generated by a phase detector of a phase lock loop (PLL).

13. The method of claim 12, further comprising:

calculating repeatable error compensation adjustment values utilizing a digital control system based on the repeatable timing errors;

storing the repeatable error compensation adjustment values in a correction table of the digital control system; and applying the repeatable error compensation adjustment values from the table to control a direct digital synthesizer (DDS) in a manner that reduces or minimizes the repeatable timing errors before they are measured by the PLL.

14. The method of claim 10, wherein if the repeatable timing errors are not sufficiently minimized in a first attempt, further comprising iteratively calculating additional repeatable error compensation adjustment values based on remaining measured repeatable timing errors for compensating the output clock signal until the repeatable timing errors are sufficiently minimized.

15. The method of claim 10, wherein servo sectors are written onto the disk in a servo writer that operates in an in-situ environment in which the servo writer is directly coupled to a disk drive comprising a head disk assembly (HDA) including the disk, an actuator arm and a head coupled to a distal end of the actuator arm, the servo writer controlling the HDA such that the actuator arm is rotated to position the head radically over the disk in order to write servo sectors onto the disk based on the output clock signal that has been processed to minimize repeatable timing errors.

16. The method of claim 10, wherein servo sectors are written onto the disk or disks in a servo writer that operates in an external media writing environment in which the servo writer controls a head that is radically positioned over a disk in order to write servo sectors onto the disk based on the output clock signal that has been processed to minimize repeatable timing errors.

17. The method of claim 10, wherein servo sectors are written onto the disk in a servo writer, based on the reference digital clock signal, the reference digital clock signal being delivered from an optical source.

18. A timing circuit for compensating for repeatable timing errors associated with a reference clock signal, the timing circuit comprising:

a direct digital synthesizer (DDS) to form a phase and frequency adjustable continuous wave signal based upon the reference clock signal;

a phase lock loop (PLL) coupled to the DDS, the PLL to measure repeatable timing errors associated with the phase and frequency adjustable continuous wave signal from the DDS and to generate an output clock signal; and a digital control system coupled to the DDS and the PLL, the digital control system to calculate repeatable error compensation adjustment values based on the repeatable timing errors measured using the PLL;

wherein the repeatable error compensation adjustment values are applied to the DDS such that the DDS can compensate for the repeatable timing errors before they are measured by the PLL and the output clock signal includes minimal repeatable timing errors and the output clock signal is used to clock the writing of servo sectors onto a disk.

19. The timing circuit of claim 18, wherein the PLL includes one of a voltage or current controlled oscillator and the repeatable timing errors are measured from one of a frequency control voltage or frequency control current applied to the voltage or current controlled oscillator, respectively.

20. The timing circuit of claim 18, wherein the PLL includes a phase detector and the repeatable timing errors are measured from a phase error signal generated by the phase detector.

21. The timing circuit of claim 18, wherein the digital control system further comprises a programmable microprocessor to control:

calculating repeatable error compensation adjustment values based on the repeatable timing errors measured by the PLL;

storing the repeatable error compensation adjustment values in an RTE correction table; and applying the repeatable error compensation adjustment values from the correction table to control the DDS in a manner that minimizes these repeatable timing errors before they are measured by the PLL.

22. The timing circuit of claim 18, wherein if the compensation of the repeatable timing errors does not sufficiently minimize the repeatable timing errors on a first attempt, the digital control system iteratively calculates additional repeatable error compensation adjustment values based on any remaining repeatable timing errors measured by the PLL for application to the DDS until the repeatable timing errors are sufficiently minimized.

* * * * *

UNITED STATES PATENT AND TRADEMARK OFFICE
CERTIFICATE OF CORRECTION

PATENT NO. : 7,199,959 B1 Page 1 of 1
APPLICATION NO. : 11/010554
DATED : April 3, 2007
INVENTOR(S) : Lawrence M. Bryant It is certified that error appears in the above-identified patent and that said Letters Patent is hereby corrected as shown below:

Column 10, Line 21, in Claim 3: Delete "or" and insert -- of -- therefor.

Signed and Sealed this

Sixteenth Day of March, 2010

David J. Kappos
*Director of the United States Patent and Trademark Office*